United States Patent [19]

You

[11] Patent Number: 5,322,372
[45] Date of Patent: Jun. 21, 1994

[54] BEARING WITH EMBEDDED SOLID LUBRICANT

[76] Inventor: Lee-Foo You, No. 14, Lane 85, Yung Feng Rd., Tai Ping Hsiang, Taichung Hsien, Taiwan

[21] Appl. No.: 31,897
[22] Filed: Mar. 16, 1993
[51] Int. Cl.⁵ .............................................. F16C 33/10
[52] U.S. Cl. ....................................... 384/293; 384/285
[58] Field of Search ............................. 384/282–285, 384/276, 293, 292, 291, 907

[56] References Cited

U.S. PATENT DOCUMENTS

| | | | |
|---|---|---|---|
| 497,210 | 5/1893 | Randall | 384/285 |
| 1,751,906 | 3/1930 | Clark | 384/293 X |
| 2,431,430 | 11/1947 | Shaw | 384/285 |
| 3,545,831 | 12/1970 | Köpke et al. | 384/284 |

FOREIGN PATENT DOCUMENTS 181918  6/1922  United Kingdom ................ 384/285

Primary Examiner—Thomas R. Hannon
Attorney, Agent, or Firm—Bacon & Thomas

[57] ABSTRACT

Disclosed is a bearing including a perforated annular body and a solid lubricant filled in holes on the perforated annular body, wherein the perforated annular body is made from a steel plate covered with a layer of copper of 1 mm in thickness and shape formed through the processes of punching, bending, and welding for permitting the layer of copper to be disposed on the inside.

1 Claim, 1 Drawing Sheet

BEARING WITH EMBEDDED SOLID LUBRICANT

BACKGROUND OF THE INVENTION

The present invention relates to bearings, and relates more particularly to a bearing with an embedded solid lubricant which is less expensive to manufacture, and which produces a satisfactory lubricating effect.

In a normal machine, bearings may be used to hold an axle allowing it to make a rotary or reciprocating motion. FIG. 1 illustrates a sleeve bearing according to the prior art, which should be lubricated with a lubricating oil so that the friction resistance between the sleeve bearing and the axle being held is reduced. In practice, despite the application of a lubricating oil, the friction resistance between the sleeve bearing and the axle is still high. FIG. 2 illustrates a bearing with an embedded solid lubricant which produces a relatively better lubricating effect. The bearing is comprised of a perforated annular body made from steel or copper, having its holes filled up with a graphitic or polyimide lubricant. Using a steel plate to make the bearing will relatively increase the friction resistance between the bearing and the axle being held. Using a copper plate to make the bearing can reduce the friction resistance, however, it will relatively increase the cost of the bearing.

SUMMARY OF THE INVENTION

The present invention has been accomplished under the aforesaid circumstances. It is therefore an object of the present invention to provide a bearing with an embedded solid lubricant which produces a satisfactory lubricating effect. It is another object of the present invention to provide a bearing with an embedded solid lubricant which is inexpensive to manufacture. These objects are achieved by covering a layer of copper of 1 mm in thickness on a steel plate, and then shape forming the copper covered steel plate through the process of punching, bending, and welding, and then filling up the holes on the copper covered steel plate with a solid lubricant.

BRIEF DESCRIPTION OF THE PREFERRED EMBODIMENT

DETAILED DESCRIPTION OF THE PREFERRED EMBODIMENT

Figure 1:
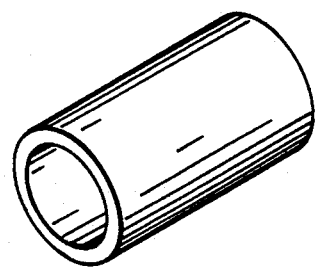
FIG. 1 is a perspective view of a sleeve bearing constructed according to the prior art.
Figure 2:
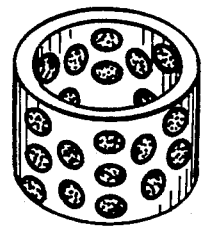
FIG. 2 is a perspective view of a bearing with an embedded solid lubricant constructed according to the prior art.
Figure 3:
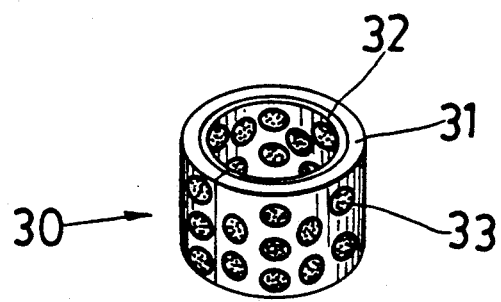
FIG. 3 is a perspective view of a bearing with an embedded solid lubricant constructed according to the present invention.

Referring to FIG. 3, a bearing with an embedded solid lubricant constructed according to the preferred embodiment of the present invention is shown and referenced by 30. The bearing 30 comprises a perforated annular body 31 made from a steel plate covered with a layer of copper 32 of 1 mm in thickness on one side, and then shape formed through the processes of punching, bending, and welding for permitting the layer of copper to be disposed on the inside. The holes on the perforated annular body 31 are then filled up with a graphitic or polyimide lubricant. Because less amount of copper is used, the cost of the bearing is relatively reduced while the friction resistance is minimized.

I claim:

1. A bearing comprising a perforated annular body with the holes thereof filled up with a solid lubricant, wherein said perforated annular body is made from a steel plate covered with a layer of copper of 1 mm in thickness on one side, and then shape formed through the processes of punching, bending, and welding for permitting said layer of copper to be disposed on the inside.

* * * * *